April 17, 1928.

G. FAST

FLEXIBLE SHAFT COUPLING

Original Filed March 17, 1925  3 Sheets-Sheet 1

1,666,445

Inventor
Gustave Fast

Attorney

April 17, 1928.

G. FAST

FLEXIBLE SHAFT COUPLING

Original Filed March 17, 1925 3 Sheets-Sheet 2

1,666,445

Inventor
Gustave Fast

By
Spear, Middleton, Donaldson & Hall
Attorney

Inventor
Gustave Fast

Patented Apr. 17, 1928.

1,666,445

UNITED STATES PATENT OFFICE.

GUSTAVE FAST, OF ANNAPOLIS, MARYLAND, ASSIGNOR TO THE BARTLETT HAYWARD COMPANY, OF BALTIMORE, MARYLAND, A CORPORATION OF MARYLAND.

FLEXIBLE SHAFT COUPLING.

Application filed March 17, 1925, Serial No. 16,191. Renewed April 16, 1927.

The invention concerns a flexible shaft coupling of the general type disclosed in Letters Patent of the United States Reissue No. 15,177, dated Aug. 16, 1921, one object of the present invention being to provide a construction by which the coupling readily may be set to disconnect the shafts or to connect them.

In the accompanying drawings:—

Figure 1:
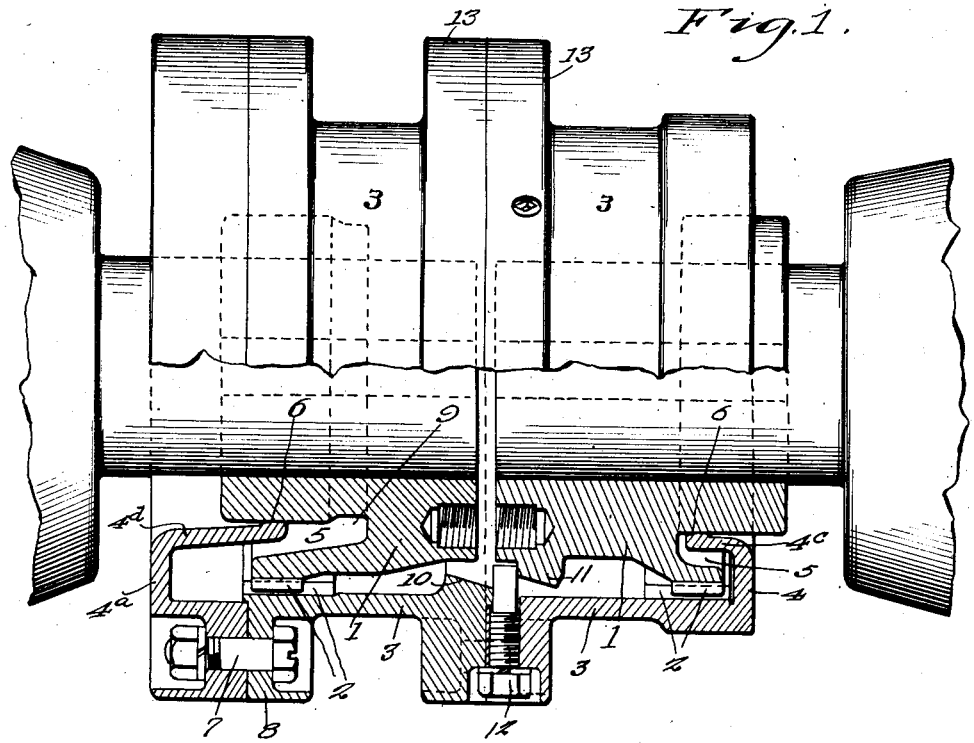
Figure 1 is in part a sectional view of a flexible coupling set in position connecting the shafts to drive one from the other.
Figure 2:
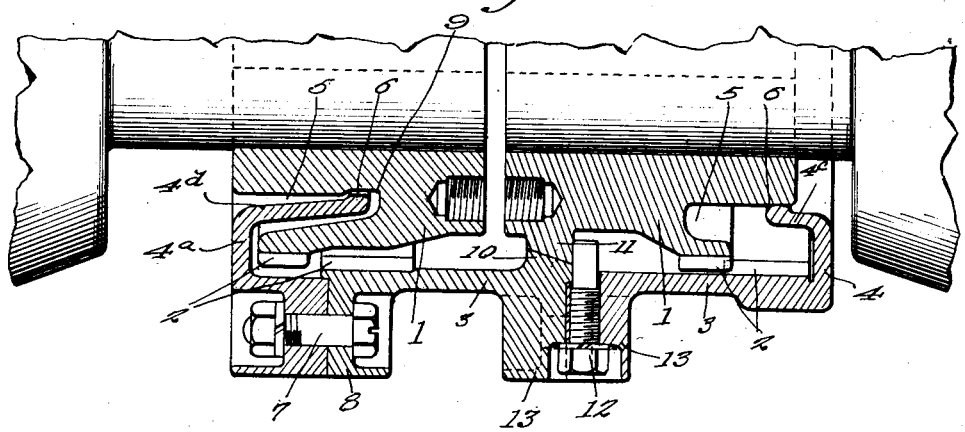
Fig. 2 is a view similar to Fig. 1 of the coupling adjusted to its disconnecting position, in which case the drive shaft may continue to run while the other shaft remains at rest.

In these drawings and referring first to Figs. 1 and 2, the coupling comprises shaft hubs 1 keyed to the ends of the motor shaft and the shaft to be driven, which may be connected with various kinds of machines. These shaft hubs have annular rows of teeth meshing with rows of teeth on the interior of and near or at the ends of the sleeve 3. These intermeshing teeth are shown at 2. The sleeve has end walls, plates or rings 4, 4ª, provided with flanges 4ᶜ, 4ᵈ of annular form concentric with the axis of the coupling and these flanges extend into annular recesses 5 at the ends of the shaft hubs, where they have rocking bearings in connection with the shaft hubs. These rocking bearings may assume various forms, but in the form chosen to illustrate the principle of my invention these rocking bearings are of the form shown at 6, consisting of rounded rib formations on the flanges bearing on the cylindrical ends of the shaft hubs.

One of the end flanges or walls of the sleeve, as shown at 4, may be formed integral with its sleeve section, while the other end wall 4ª of the sleeve may be formed separate from and bolted, as at 7, to a flange 8 of the sleeve section.

The recess 5 at the left of the coupling and the flange 4ᵈ carrying rocking bearing 6 are of greater depth than the recess 5 and flange 4ᶜ at the right of the coupling, so that the sleeve may be shifted in an axial direction to the right from the position shown in Fig. 1. When so shifted the parts will assume the relative positions shown in Fig. 2, in which the teeth of the sleeve at the left hand end thereof will become entirely disengaged from the teeth of the left hand shaft hub and the rocking bearing at 6 at the left of the coupling will become disengaged, so that despite the fact that the sleeve continues its rotation, by reason of the teeth at the right at 2 maintaining their intermeshing relation, this rotary motion of the sleeve will not be imparted to the left hand shaft hub, and this, together with the shaft to which it is attached, will remain at rest.

In the position of the parts shown in Fig. 2, the left hand rocking bearing rib at 6 comes opposite a groove or enlargement 9 of the space 5, whereas at the other end of the coupling the members of the rocking bearing maintain their engagement. The teeth at the right (2) will remain slightly engaged, so that in resetting the coupling to position to connect the shafts the teeth will be guided to attain their full meshing position without requiring any manipulation of the sleeve to properly align them. This is particularly true as to the reengagement of the teeth at the right of the coupling.

In order that the sleeve when shifted from the position of Fig. 1 to that of Fig. 2 may be held in the position shown, I form inclined annular shoulders 10 and 11 on the interior of the sleeve and the exterior of the right hand shaft hub respectively. These shoulders match each other and when in contact, as in Fig. 2, they determine the limit to which the sleeve can be shifted towards the right relative to the shaft ends in setting it in position to disconnect the shafts, and further these contacting shoulders serve to hold the sleeve concentric with the right hand shaft hub, and hence coaxially with the motor shaft so that in rotating therewith it will not vibrate or have an eccentric motion.

For locking the sleeve in this disconnected position of Fig. 2, I also employ a set screw or bolt 12 screw threaded into an opening in the wall of the sleeve. The inner end of this set bolt bears against the side face of the shoulder 11 and thus prevents displacement of the sleeve leftward relative to the shaft hub, as shown in Fig. 2, so that in its disconnected position the sleeve is held against movement in an axial direction either to the right or to the left. When the sleeve is adjusted to its connecting position of Fig. 1, the set bolt is made to engage the left hand edge of the shoulder 11 and this acts to hold the sleeve against movement/rightward relative to the shaft ends to disconnecting position.

The sleeve is formed in two sections provided with flanges 13 which are bolted together.

I have provided means by which the coupling may be shifted by mechanism for transmitting power from a hand crank or other power means in cases where the coupling is of large size.

Figure 3:
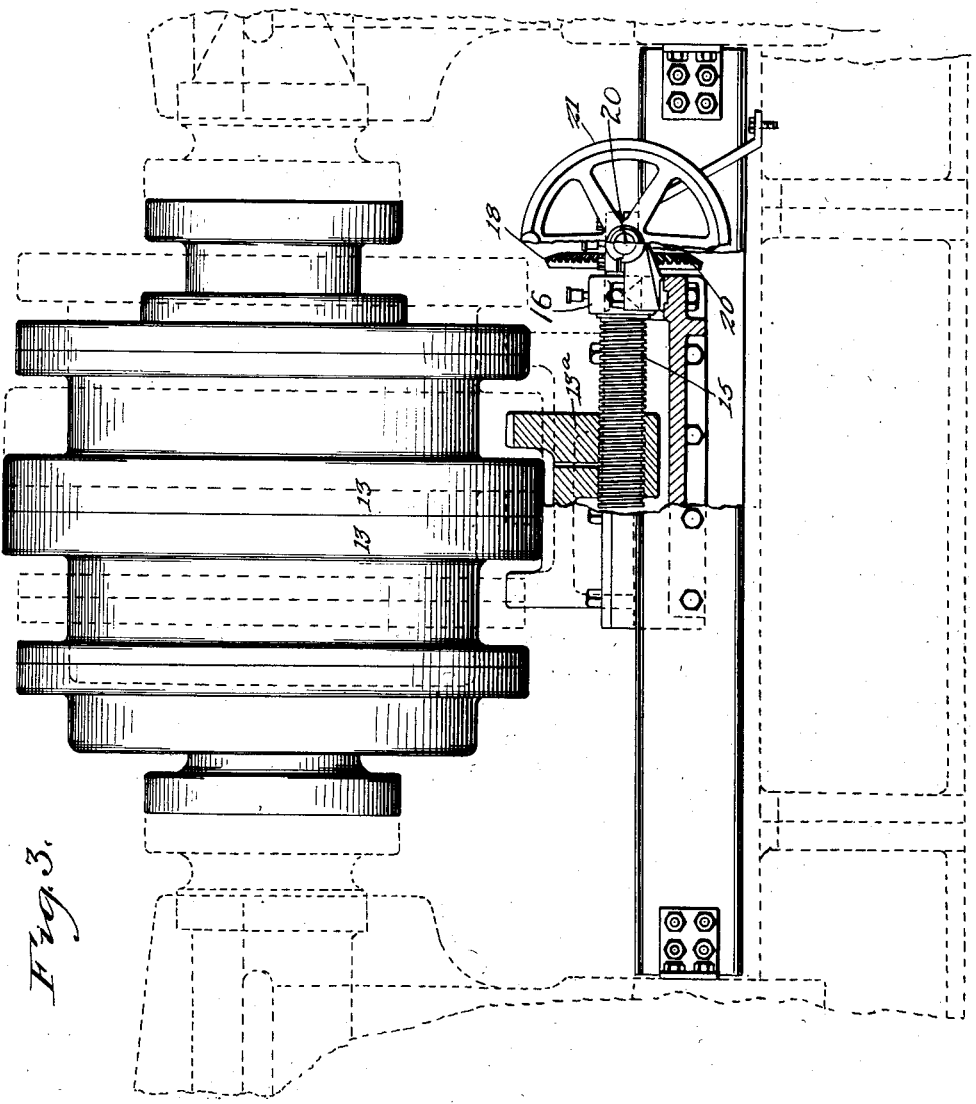
Fig. 3 is a side elevation partly in section of a coupling similar to that shown in Fig. 1, with means whereby the coupling may be set in either its connecting or disconnecting position.
Figure 4:
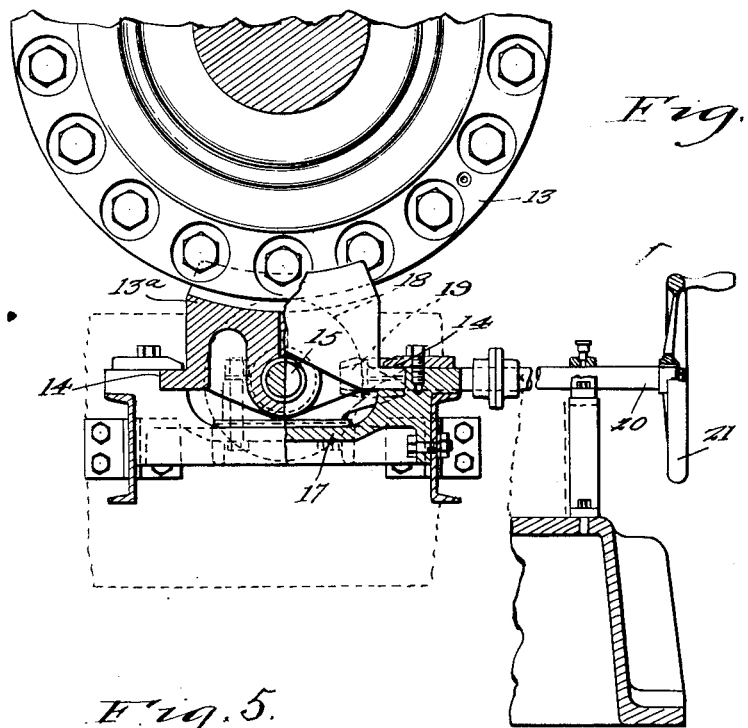
Fig. 4 is an end view of a part of the coupling with its adjusting mechanism partly in transverse section.
Figure 5:
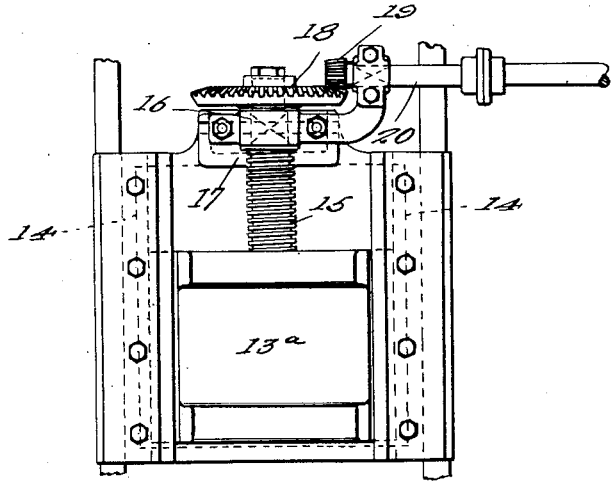
Fig. 5 is a plan view of the means for adjusting the coupling to its different conditions.

In Fig. 3 I show a forked member 13ª mounted to slide in guide ways 14, Fig. 4, when moved by a screw 15 mounted to turn in bearing 16 of the frame 17.

This screw has a bevel gear wheel 18 which is turned by a bevel pinion 19 on a shaft 20 mounted in suitable bearings in the framework and operable by a hand wheel 21 or other suitable power means. The fork 13ª embraces the flanges 13 of the coupling and when moved along the guide ways it will shift the coupling sleeve to either the position for connecting the shaft ends or for disconnecting them. The space between the fork arms is slightly greater than the combined width of the two flanges of the coupling sleeve, so that the sleeve can run free without contact with the fork, even when the shafts are misaligned to the degree tolerated.

The means for shifting the coupling is shown as mechanical as an example. Any hydraulic, pneumatic or electric means may be used.

I claim as my invention:

1. A flexible shaft coupling comprising shaft hubs each having an annular row of teeth, a sleeve having an annular row of teeth at each end to mesh with the teeth of the shaft hubs, said coupling having a bearing at each end between it and the shaft hubs, in a plane transverse to and intermediate the length of the intermeshing teeth, each of said bearings comprising members relatively rockable and slidable, the sleeve being shiftable to a position to disengage the teeth at one end thereof from their companion teeth on the shaft hub, while the teeth at the other end of the coupling remain in engagement, substantially as described.

2. A flexible shaft coupling comprising shaft hubs each having an annular row of teeth, a sleeve having an annular row of teeth at each end to mesh with the teeth of the shaft hubs, said coupling having a rocking bearing at each end between it and the shaft hubs, in a plane transverse to and intermediate the length of the intermeshing teeth, the sleeve being shiftable to a position with the teeth and the rocking bearing member at one end thereof out of engagement with the teeth and rocking bearing member of the corresponding shaft hub, substantially as described.

3. A flexible shaft coupling comprising shaft hubs each having an annular row of teeth, a sleeve having an annular row of teeth at each end to mesh with the teeth of the shaft hubs, said coupling having a rocking bearing at each end between it and the shaft hubs, in a plane transverse to and intermediate the length of the intermeshing teeth, the sleeve being shiftable to a position with the teeth and the rocking bearing member at one end thereof out of engagement with the teeth and rocking bearing member of the corresponding shaft hub, while the teeth and the rocking bearing members at the other end of the sleeve remain in engagement.

4. A shaft coupling comprising a shaft hub for each shaft, each of which has an annular row of teeth, and an annular bearing, and a sleeve having an annular row of teeth at each end and an annular bearing to engage respectively the teeth and bearing of the adjacent shaft hub, said sleeve being shiftable axially to disengage the teeth and the bearings at one end of the sleeve, said coupling having means by which the sleeve is maintained substantially concentric with the shaft end on which it is supported, when shifted to position to disconnect the shafts, substantially as described.

5. A flexible shaft coupling comprising a sleeve having teeth at its ends, shaft hubs having teeth to mesh with the teeth of the sleeve, said sleeve being shiftable axially to disengage one set of teeth from its companion set to disconnect one shaft from the other, said coupling having means by which the sleeve will be supported in concentric position relative to the row of teeth of the shaft hub to reengage the said teeth upon shifting the sleeve back again to normal position, said means being disengaged when the sleeve is in working position, substantially as described.

6. A flexible coupling comprising a shaft hub for each shaft, a sleeve, said sleeve and shaft hubs having intermeshing teeth, and said sleeve having capacity to rock in relation to the shaft hubs to accommodate misaligned shafts, and to be shifted axially to disengage teeth for disconnecting the shafts, said coupling having means for holding the sleeve concentric with the shaft end towards which it is shifted in said disconnecting action, and thereby eliminating the rocking action of the sleeve, substantially as described.

7. A flexible coupling comprising a shaft hub for each shaft, a sleeve, said sleeve and shaft hubs having intermeshing teeth, and said sleeve having capacity to rock in relation to the shaft hubs to accommodate misaligned shafts, and to be shifted axially to disengage teeth for disconnecting the shafts, said coupling having means for holding the sleeve concentric with the shaft end towards which it is shifted in said disconnecting action, said means consisting of a bearing on the hub of the shaft towards which the sleeve is shifted for disconnecting, and a bearing on the sleeve, which bearings are brought into contact when the sleeve is shifted to disconnecting position, substantially as described.

8. A flexible shaft coupling comprising a hub for each shaft, each having teeth, a sleeve having teeth to engage the hub teeth, said sleeve being shiftable axially to disengage teeth for disconnecting the shafts, and bearing surfaces between the sleeve and the hub of the shaft to which the sleeve is shifted in disconnecting the shafts, said surfaces being inclined to the axis of the coupling and contacting when the sleeve is shifted for disconnecting the shafts, substantially as described 9. A flexible shaft coupling comprising hubs to be attached to the shaft ends and a sleeve slidably connected at its ends with the shaft hubs, and shiftable axially in one direction to disconnect the shafts and in the other direction to connect said shafts, and means carried by the sleeve for engaging one of the shaft hubs for holding the sleeve against axial movement relative thereto in both the disconnecting and the connecting position of said sleeve.

10. A flexible shaft coupling comprising a hub for each shaft end having teeth, a sleeve having teeth at its ends for engaging the teeth of the shaft hubs for driving one shaft from the other, said sleeve having rocking movement relative to the shaft hubs to accommodate misaligned shafts and being shiftable axially to disengage the teeth at one end of the coupling while the teeth at the other end remain in engagement, and bearings on the sleeve and the hub of that shaft end towards which the sleeve is shifted to disconnect the shafts, said bearings coming into contact to maintain the sleeve concentric relative to the said shaft end when the sleeve is shifted to disconnect the shafts, substantially as described.

11. A flexible shaft coupling comprising a hub for each shaft end having teeth, a sleeve having teeth to engage those of the shaft hubs for driving one shaft from the other, said shaft hubs having annular recesses in their end faces, one of which is deeper than the other, and said sleeve having flanges extending into said recesses and one of which is longer than the other, said flanges having bearings between them and the shaft hubs, the bearing at the long flange being disengaged when the coupling sleeve is shifted to disconnect the teeth adjacent the end of the coupling where the long flange is located, substantially as described.

12. A flexible shaft coupling comprising a sleeve having internal teeth at its ends, shaft hubs having teeth to mesh with the teeth of the sleeve, said sleeve being shiftable axially to disengage one set of teeth to disconnect one shaft from the other, said sleeve having a rocking bearing with the shaft hubs near one end thereof, and a bearing at the end of one of the shaft hubs opposite to the end at which the rocking bearing is located, said sleeve having within it and intermediate of its length a bearing complementary to the said bearing on the shaft hub for holding the sleeve concentric with the said shaft hub when shifted to make said bearings contact with each other, substantially as described.

13. A flexible shaft coupling comprising a sleeve having internal teeth at its ends, shaft hubs attached to the shafts and having teeth thereon back from their meeting ends and meshing with the teeth of the sleeve, rocking bearings between the sleeve and the shaft hubs in a plane transverse to and intermediate the length of the teeth, a bearing on one of the shaft hubs adjacent the end of said hub opposite that at which the teeth and rocking bearing are located, and a bearing on the interior of the sleeve intermediate its length to engage the bearing on the shaft hub, said sleeve being shiftable axially to disengage its teeth at one end from the teeth of one of the shaft hubs and cause its bearing at the same time to contact with the said complementary bearing on the shaft hub, substantially as described.

14. A flexible shaft coupling comprising hubs on the meeting ends of the shaft, a sleeve embracing said shaft hubs, intermeshing teeth and rocking bearings between each end of the sleeve and the shaft hub, said sleeve being shiftable axially to disengage the teeth and rocking bearing at one end of the sleeve while the teeth and rocking bearing at the other end of the sleeve remain in engagement, and complementary bearings between the sleeve and the hub towards which the sleeve is shifted, said bearings contacting when the disengagement of the teeth and rocking bearings takes place to hold the sleeve concentric with the shaft hub for reshifting, contact between said bearings being broken when the rocking bearing and teeth reengage.

In testimony whereof, I affix my signature.

GUSTAVE FAST.